United States Patent
Maeda (10) Patent No.: US 10,434,843 B2
(45) Date of Patent: Oct. 8, 2019

(54) AIR-CONDITIONING UNIT FOR VEHICLE

(71) Applicant: DENSO CORPORATION, Kariya, Aichi-pref. (JP)

(72) Inventor: Kenichiro Maeda, Kariya (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 119 days.

(21) Appl. No.: 15/549,901

(22) PCT Filed: Feb. 29, 2016

(86) PCT No.: PCT/JP2016/056123
§ 371 (c)(1),
(2) Date: Aug. 9, 2017

(87) PCT Pub. No.: WO2016/140202
PCT Pub. Date: Sep. 9, 2016

(65) Prior Publication Data
US 2018/0022192 A1    Jan. 25, 2018

(30) Foreign Application Priority Data

Mar. 3, 2015 (JP) .................... 2015-041658

(51) Int. Cl.
*B60H 1/32* (2006.01)

(52) U.S. Cl.
CPC ......... *B60H 1/3233* (2013.01); *B60H 1/3227* (2013.01)

(58) Field of Classification Search
CPC ...... B60H 1/3223; B60H 1/3277; B60H 3/02; B60H 3/022
See application file for complete search history.

(56) References Cited

U.S. PATENT DOCUMENTS

| 6,029,739 A | 2/2000 | Izawa et al. |
| 2004/0244961 A1* | 12/2004 | Han ................ B60H 1/00028 165/203 |
| 2009/0025904 A1 | 1/2009 | Tokunaga et al. |
| 2009/0025905 A1 | 1/2009 | Tokunaga et al. |

FOREIGN PATENT DOCUMENTS

| JP | H08276722 A | 10/1996 |
| JP | H10109522 A | 4/1998 |
| JP | 2009023590 A | 2/2009 |
| JP | 2009023592 A | 2/2009 |
| JP | 2009024590 A | 2/2009 |
| JP | 2009255895 A | 11/2009 |
| JP | 2011218929 A | 11/2011 |
| JP | 2015182761 A | 10/2015 |

* cited by examiner

*Primary Examiner* — Elizabeth J Martin
(74) *Attorney, Agent, or Firm* — Harness, Dickey & Pierce, P.L.C.

(57) ABSTRACT

An air-conditioning unit for a vehicle includes an air-conditioning case; a cooler disposed in the air-conditioning case and adapted to cool air flowing through the air-conditioning case; and a blower disposed on an air-flow downstream side of the cooler and adapted to blow the air into a vehicle interior. The air-conditioning case includes a drain-hole formation portion that forms a drain hole to discharge condensed water generated in the cooler toward an outside of the air-conditioning case. The air-conditioning case is provided with a cooling structure that cools suction air drawn from the drain hole into the air-conditioning case.

17 Claims, 6 Drawing Sheets

ENLARGED VIEW OF C PART

FIG. 14

AIR-CONDITIONING UNIT FOR VEHICLE

CROSS REFERENCE TO RELATED APPLICATIONS

This application is a U.S. National Phase Application under 35 U.S.C. 371 of International Application No. PCT/JP2016/056123 filed on Feb. 29, 2016 and published in Japanese as WO 2016/140202 A1 on Sep. 9, 2016. This application is based on and claims the benefit of priority from Japanese Patent Application No. 2015-041658 filed on Mar. 3, 2015. The entire disclosures of all of the above applications are incorporated herein by reference.

TECHNICAL FIELD

The present disclosure relates to an air-conditioning unit for a vehicle, which blows temperature-adjusted air into a vehicle interior.

BACKGROUND ART

Conventionally, air-mix type vehicle air conditioners are widely known to adjust the temperature of air to be blown into the vehicle interior by regulating a mixing ratio of cold air, cooled by an evaporator as a cooling heat exchanger, to hot air, heated by a heater core as a heating heat exchanger.

Among such vehicle air conditioners, there is a so-called suction-type layout vehicle air conditioner that is equipped with a blower positioned on an air-flow downstream side of the evaporator to blow air into the vehicle interior. The suction-type layout vehicle air conditioner is described, for example, in Patent Document 1. In the vehicle air conditioner, a drain hole for discharging therefrom condensed water generated in the evaporator is formed at a bottom of an air-conditioning case that is placed on the air-flow downstream side of the evaporator.

RELATED ART DOCUMENT

Patent Document

[Patent Document 1] Japanese Unexamined Patent Application Publication No. 8-276722

SUMMARY OF INVENTION

In the vehicle air conditioner described in Patent Document 1, when the blower starts its operation, the outside air, which is located outside a vehicle compartment, is drawn into the air-conditioning case via the drain hole by a blowing pressure of the blower. Since the vehicle air conditioner has the drain hole formed on the air-flow downstream side of the evaporator, the air drawn from the outside of the vehicle compartment into the air-conditioning case via the drain hole is blown into the vehicle interior without being cooled through heat exchange in the evaporator.

Thus, for example, when the outside air temperature is high, air without being heat exchanged in the evaporator is blown into the vehicle interior, disadvantageously making an occupant feel uncomfortable because of the reduced cooling capacity.

In the vehicle air conditioner described in Patent Document 1, even in an inside-air operation mode, the outside air is drawn into the air-conditioning case through the drain hole, and then the suction air drawn into the air-conditioning case is blown into the vehicle interior as it is. Thus, when the state of the outside air is bad, for example, when there is a bad smell, smoke, or the like contained in the outside air, the air in the bad state is drawn into the air-conditioning case via the drain hole and blown into the vehicle interior, making the occupant feel uncomfortable.

The present disclosure has been made in view of the foregoing matter, and it is an object of the present disclosure to provide an air-conditioning unit for a vehicle that improves the comfort for an occupant.

According to an aspect of the present disclosure, an air-conditioning unit for a vehicle includes: an air-conditioning case; a cooler disposed in the air-conditioning case and adapted to cool air flowing through the air-conditioning case; and a blower disposed on an air-flow downstream side of the cooler and adapted to blow the air into a vehicle interior. The air-conditioning case includes a drain-hole formation portion that forms a drain hole to discharge condensed water generated in the cooler toward an outside of the air-conditioning case, and the air-conditioning case is provided with a cooling structure that cools suction air drawn from the drain hole into the air-conditioning case.

With such an arrangement, the suction air drawn from the drain hole into the air-conditioning case is cooled, thereby making it possible to improve the comfort for an occupant.

According to another aspect of the present disclosure, an air-conditioning unit for a vehicle includes: an air-conditioning case; a cooler disposed in the air-conditioning case and adapted to cool air flowing through the air-conditioning case; and a blower disposed on an air-flow downstream side of the cooler and adapted to blow the air into a vehicle interior. The air-conditioning case includes a drain-hole formation portion that forms a drain hole to discharge condensed water generated in the cooler toward an outside of the air-conditioning case, and a state changing portion that changes a state of the suction air drawn from the drain hole into the air-conditioning case.

With such an arrangement, the air-conditioning unit for a vehicle includes the state changing portion that changes the state of suction air drawn from the drain hole into the air-conditioning case, thereby making it possible to improve the comfort for an occupant.

DESCRIPTION OF EMBODIMENTS

In the following, embodiments of the present disclosure will be described with reference to the accompanying drawings. Note that in the respective embodiments below, the same or equivalent parts are indicated by the same reference characters throughout the figures.

(First Embodiment)

Figure 1:
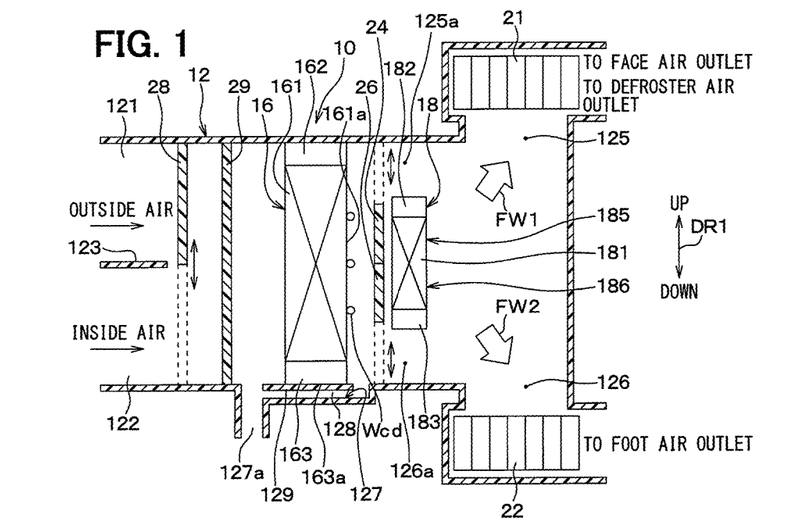
FIG. 1 is a cross-sectional view showing a main structure of a vehicle air-conditioning unit according to a first embodiment.

A vehicle air-conditioning unit 10 according to a first embodiment of the present disclosure will be described with reference to FIGS. 1 and 2. FIG. 1 is a cross-sectional view showing the main structure of the vehicle air-conditioning unit 10 in this embodiment. In FIG. 1, respective up and down arrows DR1 indicate the directions in a vehicle-mounted state where the vehicle air-conditioning unit 10 is mounted on a vehicle. That is, both end-arrows DR1 shown in FIG. 1 denote the up and down directions of the vehicle.

The vehicle air-conditioning unit 10 shown in FIG. 1 configures parts of a vehicle air conditioner, including a compressor and a condenser that are disposed in an engine room of the vehicle. The vehicle air-conditioning unit 10 is disposed inside a dashboard, i.e., inside an instrumental panel at the foremost portion of the vehicle interior.

As shown in FIG. 1, the vehicle air-conditioning unit 10 includes an air-conditioning case 12, an evaporator 16, a heater core 18, a first air mix door 24, a second air mix door 26, an inside/outside air switching door 28, a dust-proof filter 29, a first blower 21, and a second blower 22. The vehicle air-conditioning unit 10 in this embodiment has a suction-type layout in which the first blower 21 and the second blower 22 are disposed on the air-flow downstream side with respect to the evaporator 16.

The air-conditioning case 12 is a resin member that forms an outer shell of the vehicle air-conditioning unit 10 and has a substantially rectangular parallelepiped contour. FIG. 1 shows main parts of the entire air-conditioning case 12.

The air-conditioning case 12 has a partition wall 123 that separates an outside-air introduction port 121 for introducing outside air as the air outside the vehicle compartment from an inside-air introduction port 122 for introducing inside air as the air in the vehicle interior. The outside air as the air outside the vehicle compartment or the inside air as the air in the vehicle interior is introduced into the air-conditioning case 12 by the first blower 21 or the second blower 22. Together with this, within the air-conditioning case 12, an air flow is generated to pass through a first ventilation passage 125 as indicated by an arrow FW1, and another air flow is generated to pass through a second ventilation passage 126 as indicated by an arrow FW2.

The outside air or inside air introduced into the air-conditioning case 12 is caused to flow into the evaporator 16 through the dust-proof filter 29. That is, the air-conditioning case 12 is provided with the outside-air introduction port 121 for introducing the outside air into the air-conditioning case 12 and the inside-air introduction port 122 for introducing the inside air into the air-conditioning case 12. Both the outside-air introduction port 121 and the inside-air introduction port 122 are disposed on an air-flow upstream side with respect to the evaporator 16.

The evaporator 16 is a cooling heat exchanger or a cooler that cools air flowing through the air-conditioning case 12. The evaporator 16 is accommodated in the air-conditioning case 12 and disposed to receive the inflow of the outside air or inside air introduced into the air-conditioning case 12. The evaporator 16 configures a known refrigeration cycle device for circulation of a refrigerant together with a compressor, a condenser, and an expansion valve (not shown). The evaporator 16 cools the air passing through the evaporator 16 by evaporation of the refrigerant.

The structure of the evaporator 16 is substantially the same as that of a known evaporator commonly used in a vehicle air conditioner. Specifically, the evaporator 16 includes a core portion 161 that cools the air flowing through the air-conditioning case 12 by heat exchange, a first header tank 162 disposed at an upper end of the core portion 161, and a second header tank 163 disposed at a lower end of the core portion 161. The core portion 161, the first header tank 162, and the second header tank 163 are formed of metal with high thermal conductivity, such as aluminum. The core portion 161 of the evaporator 16 includes a plurality of refrigerant tubes, each communicating with the header tanks 162 and 163 and having a flat cross-sectional shape, and a plurality of corrugated fins formed in a wave shape and disposed between the adjacent refrigerant tubes. Furthermore, the core portion 161 has a structure in which the refrigerant tubes and the corrugated fins are alternately stacked in the vehicle front-back direction.

In the evaporator 16 of this embodiment, an outflow surface thereof through which air flows from the core portion 161 (namely, air outflow surface 161a) is disposed vertically relative to a horizontal plane such that the air passing through the core portion 161 is oriented in a horizontal direction.

The evaporator 16 exchanges heat between a low-temperature refrigerant flowing through the refrigerant tubes and air passing through the core portion 161, thereby cooling the air. The core portion 161 is partitioned into a plurality of fine air passages by the refrigerant tubes and the corrugated fins, so that in the core portion 161, the air mainly flows along the thickness direction of the core portion 161.

In the evaporator 16, the air outflow surface 161a from which the air passing through the core portion 161 flows is disposed in parallel with a vehicle up-down direction DR1. That is, the evaporator 16 is disposed within the air-conditioning case 12 such that the air passing through the core portion 161 is oriented in the horizontal direction.

The heater core 18 is a heating heat exchanger, i.e., a heater that heats the air flowing out of the evaporator 16 with an engine coolant, which is hot water. The heater core 18 is disposed on an air-flow downstream side with respect to the evaporator 16 in the air-conditioning case 12.

The structure of the heater core 18 is substantially the same as that of a known heating heat exchanger commonly used in a vehicle air conditioner. Specifically, the heater core 18 includes a core portion 181 and a first header tank 182 and a second header tank 183 which are respectively disposed at both ends of the core portion 181. The core portion 181 of the heater core 18 includes a plurality of hot-water tubes, each communicating with the header tanks 182 and 183 and having a flat cross-sectional shape, and a plurality of corrugated fins formed in a wave shape and disposed between the adjacent hot-water tubes. Furthermore, the core portion 181 has a structure in which the hot-water tubes and the corrugated fins are alternately stacked in the vehicle front-back direction.

The heater core 18 exchanges heat between a high-temperature engine coolant flowing through the hot-water tubes and the air passing through the core portion 181, thereby heating the air. The core portion 181 is partitioned into a plurality of fine air passages by the hot-water tubes and the corrugated fins, so that in the core portion 181, the air mainly flows along the thickness direction of the core portion 181. The heater core 18 is disposed such that the first header tank 182 is positioned above the second header tank 183. Thus, the first header tank 182 serves as an upper end of the heater core 18, while the second header tank 183 serves as a lower end of the heater core 18.

The heater core 18 is spaced apart from the evaporator 16 and disposed such that an air outflow surface 161a from which the air passing through the core portion 181 flows is disposed in parallel with the vehicle up-down direction DR1. That is, the heater core 18 is disposed within the air-conditioning case 12 such that the air passing through the core portion 181 is oriented in the horizontal direction.

The first air mix door 24 and the second air mix door 26 are provided between the heater core 18 and the evaporator 16.

The first air mix door 24 is disposed between the evaporator 16 and a first heating portion 185 positioned in an upper part of the heater core 18. The first air mix door 24 has a slide door mechanism and is adapted to slide by an electric actuator (not shown).

The first air mix door 24 adjusts the ratio of the volume of air passing through the first heating portion 185 to that of air passing through a first bypass passage 125a that bypasses the upper side of the heater core 18 in the air-conditioning case 12, in accordance with its slide position. The first bypass passage 125a is disposed above the heater core 18.

The first air mix door 24 is moved between a max cool position and a max hot position. In the max cool position, the first air mix door 24 interrupts the air flow to the first heating portion 185 and causes the whole air to flow to the first bypass passage 125a. In the max hot position, the first air mix door 24 interrupts the air flow to the first bypass passage 125a and causes the whole air to flow to the first heating portion 185. Note that in FIG. 1, the first air mix door 24 in the max cool position is illustrated by a solid line, while the first air mix door 24 in the max hot position is illustrated by a dotted line.

On the air-flow downstream side of the heater core 18, hot air passing through the first heating portion 185 of the heater core 18 and cold air passing through the first bypass passage 125a are mixed to be introduced into the vehicle interior mainly as indicated by the arrow FW1. Thus, the air flowing on the air-flow downstream side of the heater core 18 has its temperature adjusted in accordance with the slide position of the first air mix door 24 and is then blown into the vehicle interior.

The second air mix door 26 is disposed between the evaporator 16 and a second heating portion 186 positioned in a lower part of the heater core 18. The second air mix door 26 has the same slide door mechanism as the first air mix door 24 and is adapted to slide by an electric actuator (not shown).

The second air mix door 26 adjusts the ratio of the volume of air passing through the second heating portion 186 to the volume of air passing through a second bypass passage 126a that bypasses the lower side of the heater core 18 in the air-conditioning case 12, in accordance with its slide position. The second bypass passage 126a is disposed below the heater core 18.

The second air mix door 26 is moved between the max cool position and the max hot position. In the max cool position, the second air mix door 26 interrupts the air flow to the second heating portion 186 and causes the whole air to flow to the second bypass passage 126a. In the max hot position, the second air mix door 26 interrupts the air flow to the second bypass passage 126a and causes the whole air to flow to the second heating portion 186. Note that in FIG. 1, the second air mix door 26 in the max cool position is illustrated by a solid line, while the second air mix door 26 in the max hot position is illustrated by a dotted line.

On the air-flow downstream side of the heater core 18, hot air passing through the second heating portion 186 of the heater core 18 and cold air passing through the second bypass passage 126a are mixed to be introduced into the vehicle interior mainly as indicated by the arrow FW2. Thus, the air flowing through the second ventilation passage 126 has its temperature adjusted in accordance with the slide position of the second air mix door 26 and is then blown into the vehicle interior.

The air-conditioning case 12 is provided with a plurality of air outlets (not shown) for blowing the conditioned air that has its temperature adjusted in accordance with the slide positions of the first and second air mix doors 24 and 26. For example, the plurality of air outlets includes a face air outlet for blowing the conditioned air toward the upper body of an occupant in the vehicle interior, a foot air outlet for blowing the conditioned air toward the feet of the occupant, and a defroster air outlet for blowing the conditioned air toward the inner surface of a windshield of the vehicle.

The conditioned air having its temperature adjusted is respectively blown into the vehicle interior via any of the plurality of air outlets.

The first blower 21 and the second blower 22 are disposed in the air-conditioning case 12. Each of the first blower 21 and the second blower 22 is a centrifugal blower that blows the air introduced into the inside-air introduction port 122 or outside-air introduction port 121. The first blower 21 is disposed in a position that communicates with the face air outlet and the foot air outlet. The first blower 21 blows the air from the face air outlet and the foot air outlet into the vehicle interior. The second blower 22 is disposed in a position that communicates with the foot air outlet. The second blower 22 blows the air from the foot air outlet into the vehicle interior.

A bottom surface 127 of the air-conditioning case 12 is provided with a drain hole 127a and a drain hole formation portion for forming the drain hole. The drain hole 127a is to discharge condensed water Wcd generated in the evaporator 16 into the outside of the vehicle compartment. The drain hole 127a in this embodiment is provided on the bottom surface 127 of the air-conditioning case 12 disposed on the air-flow upstream side of the evaporator 16.

The air-conditioning case 12 includes a communication path 128 and a support portion 129. The communication path 128 communicates a space on the air-flow downstream side of the evaporator 16 with a space on the air-flow upstream side of the evaporator 16. The support portion 129 supports a bottom portion 163a forming the bottom surface part of the evaporator 16. Note that the bottom portion 163a of the evaporator 16 is the bottom surface part of the second header tank 163 in the evaporator 16. That is, the communication path 128 that communicates the space on the air-flow downstream side of the evaporator 16 with the space on the air-flow upstream side of the evaporator 16 is formed in a gap between the bottom surface 127 of the air-conditioning case 12 and the bottom portion 163*a* of the evaporator 16.

With the above-mentioned arrangement, when the first blower 21 and second blower 22 start their operations, the air is introduced into the air-conditioning case 12 via the outside-air introduction port 121 or inside-air introduction port 122 by blowing pressure of the first and second blowers 21 and 22. Then, the air introduced into the air-conditioning case 12 passes through the dust-proof filter 29 and evaporator 16 and then exchanges heat with the evaporator 16 to be cooled.

Here, the condensed water Wcd generated in the evaporator 16 mainly drops onto the bottom surface 127 of the air-conditioning case 12 on the air-flow downstream side of the evaporator 16, and then reaches the drain hole 127*a* through the communication path 128. Note that part of the condensed water Wcd generated in the evaporator 16 drops onto the bottom surface 127 of the air-conditioning case 12 on the air-flow upstream side of the evaporator 16, and then reaches the drain hole 127*a*. The condensed water Wcd that reaches the drain hole 127*a* is discharged from the drain hole 127*a* toward the outside of the vehicle compartment.

When the first blower 21 and second blower 22 start their operations, the outside air located outside the vehicle compartment is drawn into the air-conditioning case 12 via the drain hole 127*a* by the blowing pressure of the first and second blowers 21 and 22.

Figure 2:
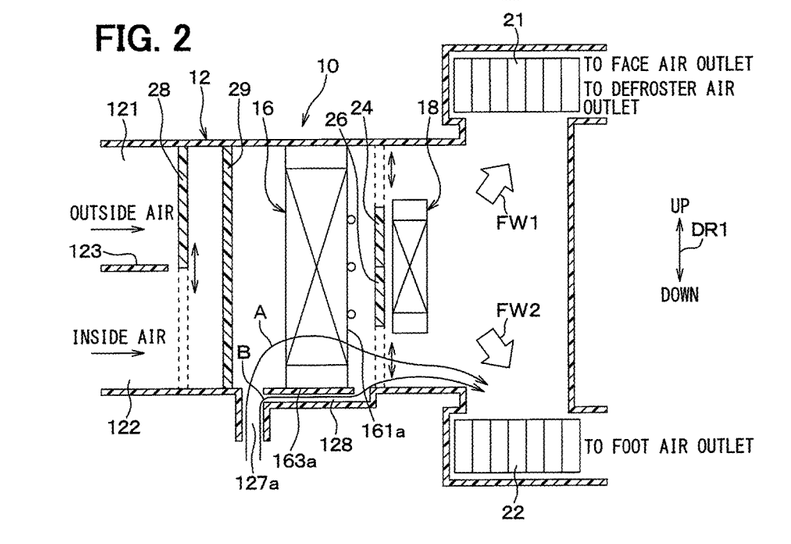
FIG. 2 is a diagram showing a route through which the suction air drawn from a drain hole into an air-conditioning case passes.

Most of the suction air drawn into the air-conditioning case 12 passes through the lower side of the core portion 161 of the evaporator 16 to reach the air-flow downstream side of the evaporator 16 as indicated by the arrow A of FIG. 2. On the other hand, the remaining suction air drawn into the air-conditioning case 12 passes through the communication path 128 and reaches the air-flow downstream side of the evaporator 16 as indicated by the arrow B of FIG. 2. These suction air flows are introduced into the vehicle interior mainly via the foot air outlet.

Here, the suction air passing through the core portion 161 of the evaporator 16 is cooled by exchanging heat with the core portion 161, and further, the suction air passing through the communication path 128 is cooled by exchanging heat with the condensed water Wcd at a relatively low temperature that passes through the communication path 128.

The evaporator 16 has the function of reducing bad smell, smoke, and the like contained in the air passing through the core portion 161. That is, bad smell, smoke, and the like contained in the air passing through the core portion 161 are absorbed in the condensed water Wcd. The air flowing out of the core portion 161 has the bad smell, smoke, and the like therein absorbed therefrom into the condensed water Wcd. Likewise, the suction air passing through the communication path 128 also has the bad smell, smoke, and the like therein absorbed therefrom into the condensed water Wcd.

The air flowing out of the core portion 161 and the air passing through the communication path 128 have their temperatures adjusted in accordance with the slide positions of the first and second air mix doors 24 and 26. Subsequently, the air having its temperature adjusted is introduced into the vehicle interior via the face air outlet, defroster air outlet, and foot air outlet.

With the above-mentioned arrangement, the air-conditioning case 12 has the drain hole 127*a* from which the condensed water Wcd generated in the evaporator 16 is discharged toward the outside of the air-conditioning case 12. The vehicle air-conditioning unit is provided with a cooling structure in which the suction air drawn from the drain hole 127*a* into the air-conditioning case 12 is cooled before being blown into the vehicle interior, thereby making it possible to improve the comfort for an occupant.

Specifically, the drain hole 127*a* is disposed on the air-flow upstream side with respect to the evaporator 16. The drain hole 127*a* and evaporator 16 are configured such that at least part of the suction air drawn from the drain hole 127*a* into the air-conditioning case 12 passes through the core portion 161 of the evaporator 16 and is cooled by exchanging heat with the core portion 161. Therefore, the cooling capacity of the air-conditioning unit in this embodiment can be improved, as compared to a device in which suction air is introduced into the vehicle interior without exchanging heat with the evaporator 16, such as the device described in Patent Document 1. Consequently, this embodiment can improve the comfort for an occupant.

The air-conditioning case 12 has the communication path 128 and the support portion 129. The communication path 128 communicates the space on the air-flow downstream side of the evaporator 16 with the space on the air-flow upstream side of the evaporator 16. The support portion 129 supports the bottom portion of the evaporator 16. The condensed water Wcd on the air-flow downstream side of the evaporator 16 passes through the communication path 128 and reaches the drain hole, while at least part of the suction air passes through the communication path 128 and reaches the air-flow downstream side of the evaporator 16. During this time, the part of the suction air exchanges heat with the condensed water Wcd and thereby is cooled. Accordingly, this embodiment can further improve the cooling capacity.

Note that in the vehicle air-conditioning unit 10, most of suction air drawn into the air-conditioning case 12 is caused to pass through the core portion 161 of the evaporator 16. The evaporator 16 has the function of reducing bad smell, smoke, and the like contained in the air passing through the core portion 161. Thus, for example, even though the outside air containing bad smell, smoke, and the like is drawn as the suction air from the drain hole 127*a* into the air-conditioning case 12, such bad smell, smoke, and the like are absorbed by the evaporator 16. In this way, the vehicle air-conditioning unit 10 also has an effect of reducing bad smell, smoke, and the like to be introduced into the vehicle interior.

As indicated by the arrow A in FIG. 2, most of the suction air drawn into the air-conditioning case 12 passes through the lower side of the core portion 161 in the evaporator 16, to be introduced into the vehicle interior via the foot air outlet. As indicated by the arrow B in FIG. 2, the remaining suction air drawn into the air-conditioning case 12 passes through the communication path 128 to reach the air-flow downstream side of the evaporator 16. The suction air that passes through the communication path 128 and reaches the air-flow downstream side of the evaporator 16 is introduced into the vehicle interior via the second ventilation passage 126 and the foot air outlet on the lower side of the air-conditioning case 12. Thus, the majority of suction air reaches the feet side of an occupant, even though bad smell, smoke, or the like remains in the air introduced into the vehicle interior. Accordingly, in this embodiment, air containing bad smell, smoke, or the like barely reaches the vicinity of the face of an occupant, thereby making it possible to reduce discomfort for the occupant because of the bad smell, smoke, or the like.

(Second Embodiment)

Figure 3:
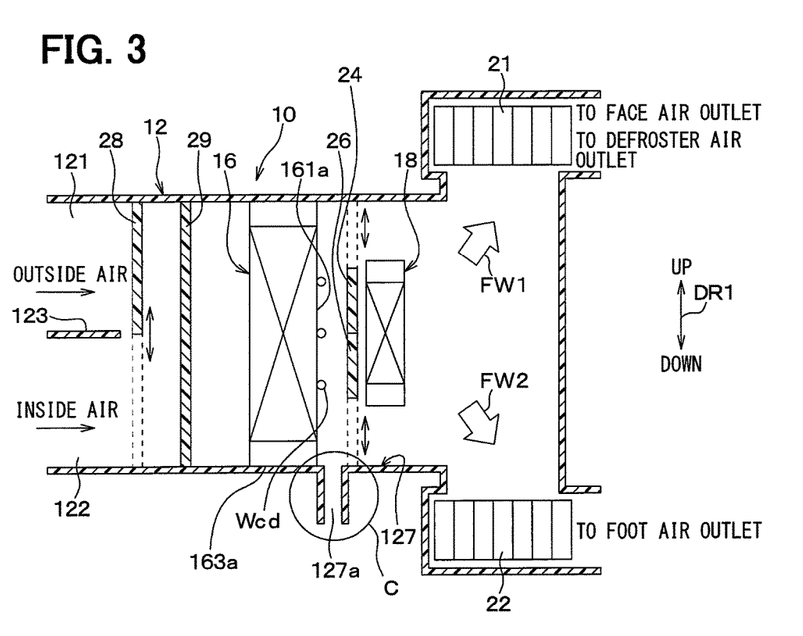
FIG. 3 is a cross-sectional view showing a main structure of a vehicle air-conditioning unit according to a second embodiment.

A vehicle air-conditioning unit 10 according to a second embodiment of the present disclosure will be described with reference to FIGS. 3 and 4. FIG. 3 is a cross-sectional view showing the main structure of the vehicle air-conditioning unit 10 in this embodiment.

In the vehicle air-conditioning unit 10 of the first embodiment, the drain hole 127a is formed at the bottom surface 127 of the air-conditioning case 12 on the air-flow upstream side of the evaporator 16. In contrast, in the vehicle air-conditioning unit 10 of this embodiment, the drain hole 127a is formed at the bottom surface 127 of the air-conditioning case 12 on the air-flow downstream side of the evaporator 16.

In the vehicle air-conditioning unit 10 of the first embodiment, the communication path 128 is formed at the air-conditioning case 12 so as to communicate the space on the air-flow downstream side of the evaporator 16 with the space on the air-flow upstream side of the evaporator 16. In contrast, in the vehicle air-conditioning unit 10 of this embodiment, there is no component that corresponds to the communication path 128 in the air-conditioning case 12.

Figure 4:
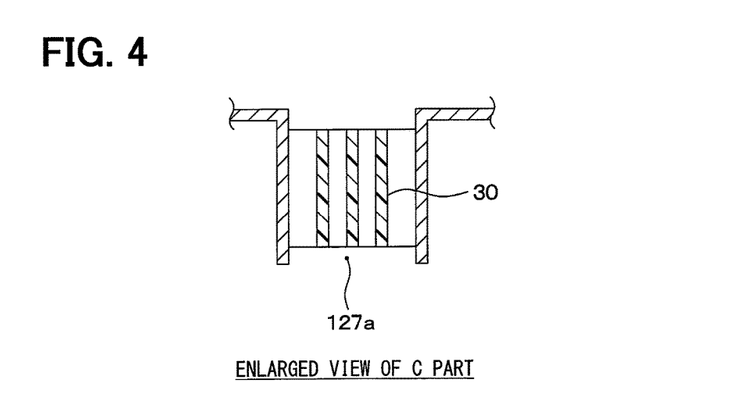
FIG. 4 is an enlarged view of a C part shown in FIG. 3.

As shown in FIG. 4, in the vehicle air-conditioning unit 10 of this embodiment, metal fins 30 are provided inside the drain hole 127a. The metal fins 30 serve as a heat dissipation member that promotes heat exchange between the condensed water Wcd and the suction air drawn from the drain hole 127a into the air-conditioning case 12. Note that the metal fins 30 correspond to a state changing portion that changes the state of suction air drawn from the drain hole 127a into the air-conditioning case 12.

The metal fins 30 are formed of metal having high thermal conductivity, such as aluminum. The metal fins 30 are formed to have concave and convex portions to achieve wider surface areas.

The condensed water Wcd generated in the evaporator 16 mainly drops onto the bottom surface 127 of the air-conditioning case 12 on the air-flow downstream side of the evaporator 16, reaches the drain hole 127a, and is then attached to the metal fins 30 provided in the drain hole 127a. Here, the metal fins 30 promote the heat exchange between the condensed water Wcd and the suction air drawn from the drain hole 127a into the air-conditioning case 12, whereby the suction air is effectively cooled and drawn into the air-conditioning case 12.

In this way, the metal fins 30 promote the heat exchange between the condensed water Wcd and the suction air drawn from the drain hole 127a into the air-conditioning case 12, thereby changing the state of the suction air drawn from the drain hole 127a into the air-conditioning case 12. Specifically, the suction air drawn from the drain hole 127a into the air-conditioning case 12 is cooled.

With the above-mentioned arrangement, the vehicle air-conditioning unit 10 includes, in the air-conditioning case 12, the state changing portion that changes the state of suction air drawn from the drain hole 127a into the air-conditioning case 12, thereby making it possible to improve the comfort for an occupant.

Specifically, the air-conditioning case 12 includes the metal fins 30 as the state changing portion, which promotes the heat exchange between the condensed water Wcd and the suction air drawn from the drain hole 127a into the air-conditioning case 12. Thus, the heat exchange between the suction air and the condensed water Wcd is promoted by the metal fins 30. Furthermore, the metal fins 30 cause the suction air cooled to a lower temperature to be introduced into the vehicle interior, thereby making it possible to improve the comfort for an occupant.

Further, the vehicle air-conditioning unit is configured to cool the suction air drawn from the drain hole 127a into the air-conditioning case 12 by using the metal fins 30. Note that the structures of other components in this embodiment are the same as those in the first embodiment.

(Third Embodiment)

Figure 5:
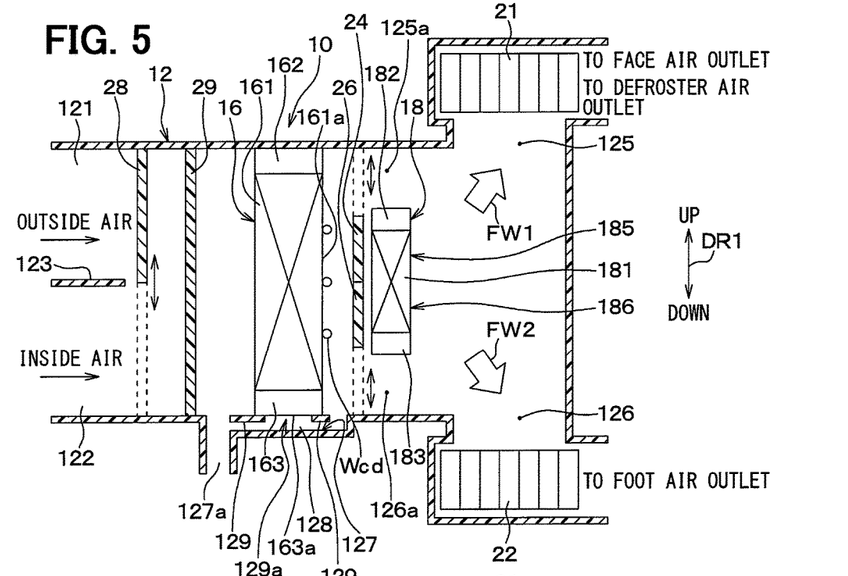
FIG. 5 is a cross-sectional view showing a main structure of a vehicle air-conditioning unit according to a third embodiment.

A vehicle air-conditioning unit 10 according to a third embodiment of the present disclosure will be described with reference to FIG. 5. FIG. 5 is a cross-sectional view showing the main structure of the vehicle air-conditioning unit 10 in this embodiment.

In the vehicle air-conditioning unit 10 of the first embodiment, the support portion 129 is formed in the air-conditioning case 12. The support portion 129 prevents the suction air passing through the communication path 128 from being in direct contact with the bottom portion 163a of the evaporator 16. Thus, in the first embodiment, the suction air passing through the communication path 128 is prevented from being in direct contact with the bottom portion 163a of the evaporator 16. In contrast, in the air-conditioning case 12 of this embodiment, an opening portion 129a is formed in the support portion 129 that supports the bottom portion 163a forming the bottom surface part of the evaporator 16. Thus, the air-conditioning case 12 of this embodiment is configured such that the suction air passing through the communication path 128 via the opening portion 129a is in direct contact with the bottom portion 163a of the evaporator 16.

In this way, since the suction air drawn into the air-conditioning case 12 via the drain hole 127a is in direct contact with the bottom portion 163a of the evaporator 16, the suction air passing through the communication path 128 is cooled by heat exchange with the bottom portion 163a of the evaporator 16. Furthermore, the suction air passing through the communication path 128 is also cooled by the heat exchange with the condensed water Wcd passing through the communication path 128.

Note that the structures of other components in this embodiment are the same as those in the first embodiment. In this embodiment, the effects exhibited by the structure common to that in the first embodiment can be obtained in the same manner as the first embodiment.

The suction air passing through the communication path 128 exchanges heat with the bottom portion 163a of the evaporator 16 and thereby is cooled, so that the cooling capacity of this embodiment can be improved, as compared to the vehicle air conditioning unit 10 in the first embodiment.

(Fourth Embodiment)

Figure 6:
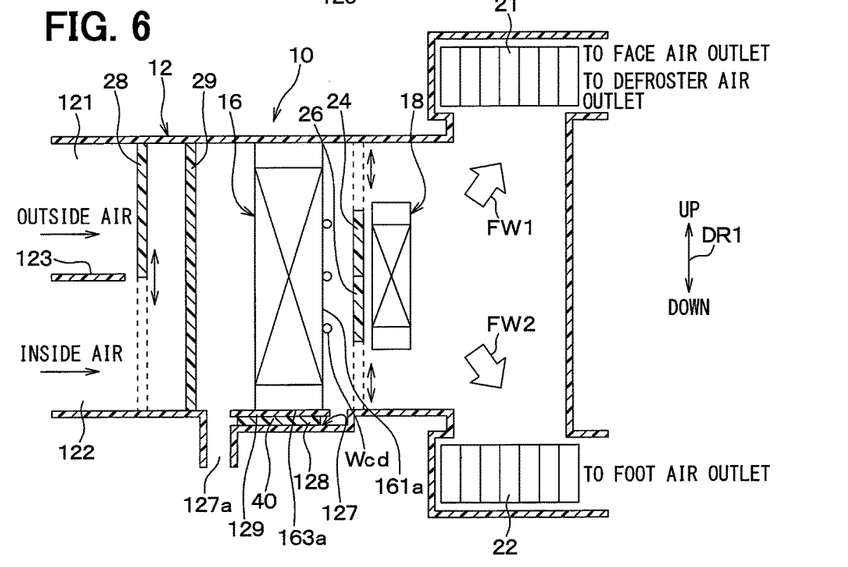
FIG. 6 is a cross-sectional view showing a main structure of a vehicle air-conditioning unit according to a fourth embodiment.

A vehicle air-conditioning unit 10 according to a fourth embodiment of the present disclosure will be described with reference to FIG. 6. FIG. 6 is a cross-sectional view showing the main structure of the vehicle air-conditioning unit 10 in this embodiment.

The air-conditioning case 12 of the first embodiment includes the communication path 128 that communicates the space on the air-flow downstream side of the evaporator 16 with the space on the air-flow upstream side of the evaporator 16. The vehicle air-conditioning unit 10 in this embodiment differs from the first embodiment in that the communication path 128 includes a water absorbing sponge 40 with excellent water absorbability.

The condensed water Wcd generated in the evaporator 16 mainly drops onto the bottom surface 127 of the air-conditioning case 12 on the air-flow downstream side of the evaporator 16, and then is absorbed in the water absorbing sponge 40 disposed in the communication path 128. Excess condensed water Wcd that cannot be absorbed in the water absorbing sponge 40 is discharged from the drain hole 127*a* toward the outside of the vehicle compartment.

The suction air drawn from the drain hole 127*a* into the air-conditioning case 12 barely passes through a side of the communication path 128 equipped with the water absorbing sponge 40. The majority of the suction air passes through the core portion 161 of the evaporator 16. Thus, this embodiment can improve the cooling capacity for the suction air, compared to a case in which the communication path 128 is not equipped with any water absorbing sponge 40.

Note that the structures of other components in this embodiment are the same as those in the first embodiment. In this embodiment, the effects exhibited by the structure common to that in the first embodiment can be obtained in the same manner as the first embodiment.

Although in this embodiment, the communication path 128 includes the water absorbing sponge 40 with excellent water absorbability, a communication path 128 may include a water absorbing packing with excellent water absorbability.

(Fifth Embodiment)

Figure 7:
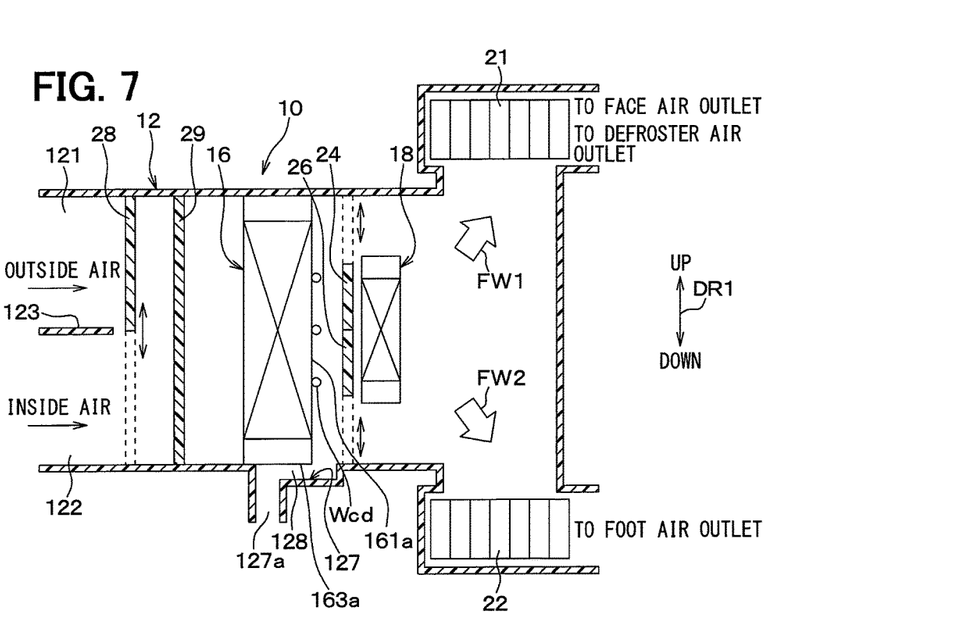
FIG. 7 is a cross-sectional view showing a main structure of a vehicle air-conditioning unit according to a fifth embodiment.

A vehicle air-conditioning unit 10 according to a fifth embodiment of the present disclosure will be described with reference to FIG. 7. FIG. 7 is a cross-sectional view showing the main structure of the vehicle air-conditioning unit 10 in this embodiment.

In the vehicle air-conditioning unit 10 of the first embodiment, the drain hole 127*a* is formed at the bottom surface 127 of the air-conditioning case 12 located on the air-flow upstream side of the evaporator 16. In contrast, in the vehicle air-conditioning unit 10 of this embodiment, the drain hole 127*a* is formed at the bottom surface 127 of the air-conditioning case 12 located below the evaporator 16. More specifically, the position of the drain hole 127*a* is directly under the evaporator 16.

In the air-conditioning case 12 of the vehicle air-conditioning unit 10 in the first embodiment, the communication path 128 is formed to communicate the space on the air-flow downstream side of the evaporator 16 with the space on the air-flow upstream side of the evaporator 16. Alternatively, in the air-conditioning case 12 of the vehicle air-conditioning unit 10 in this embodiment, a communication path 128 is formed in a gap between the bottom surface 127 of the air-conditioning case 12 and the bottom portion 163*a* of the evaporator 16 so as to couple the space on the air-flow downstream side of the evaporator 16 to a space where the drain hole 127*a* is formed.

In the vehicle air-conditioning unit 10 of this embodiment, the bottom surface 127 of the air-conditioning case 12 is abutted against the bottom portion 163*a* on the air-flow upstream side of the evaporator 16, thereby sealing a space between the space on the air-flow upstream side of the evaporator 16 and the space where the drain hole 127*a* is formed. A part of the bottom surface 127 of the air-conditioning case 12 that is abutted against the bottom portion 163*a* on the air-flow upstream side of the evaporator 16 corresponds to the support portion.

With the above-mentioned structure, the communication path 128 is formed (in a gap) between the bottom surface 127 of the air-conditioning case 12 and the bottom portion 163*a* of the evaporator 16 so as to couple the space on the air-flow downstream side of the evaporator 16 to the space where the drain hole 127*a* is formed. Thus, the suction air drawn into the air-conditioning case 12 through the drain hole 127*a* is cooled not only by the condensed water passing through the communication path 128, but also by heat exchange with the bottom portion 163*a* of the evaporator 16.

The vehicle air-conditioning unit 10 in this embodiment seals the gap between the space on the air-flow upstream side of the evaporator 16 and the space where the drain hole 127*a* is formed, thereby allowing all air introduced into the air-conditioning case 12 from the inside-air introduction port 122 or outside-air introduction port 121 to pass through the core portion 161 of the evaporator 16. Accordingly, this embodiment can further improve the cooling capacity, compared to the case of not sealing a gap between the space on the air-flow upstream side of the evaporator 16 and the space where the drain hole 127*a* is formed.

Note that the structures of other components in this embodiment are the same as those in the first embodiment. In this embodiment, the effects exhibited by the structure common to that in the first embodiment can be obtained in the same manner as the first embodiment.

As mentioned above, the drain hole 127*a* in this embodiment is provided on the bottom surface 127 of the air-conditioning case 12 located below the evaporator 16. In the air-conditioning case 12, the communication path 128 is formed between the bottom surface 127 of the air-conditioning case 12 and the bottom portion 163*a* of the evaporator 16 so as to communicate the space on the air-flow downstream side of the evaporator 16 with the space where the drain hole 127*a* is formed. The condensed water on the air-flow downstream side of the evaporator 16 passes through the communication path 128 and reaches the drain hole 127*a*. At least part of the suction air exchanges heat with the condensed water and the bottom portion 163*a* of the evaporator 16 and thereby is cooled when passing through the communication path 128 and then reaching the air-flow downstream side of the evaporator 16.

(Sixth Embodiment)

Figure 8:
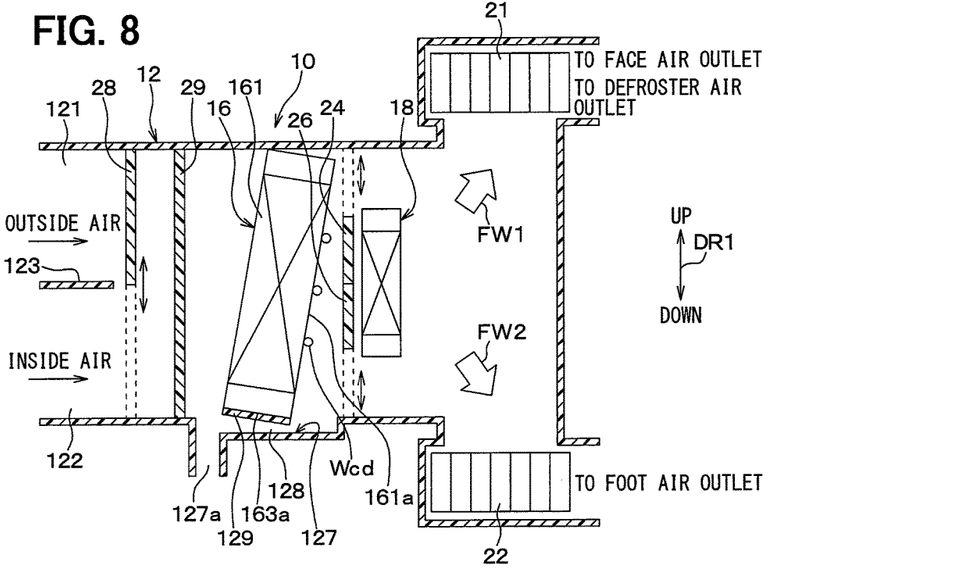
FIG. 8 is a cross-sectional view showing a main structure of a vehicle air-conditioning unit according to a sixth embodiment.

A vehicle air-conditioning unit 10 according to a sixth embodiment of the present disclosure will be described with reference to FIG. 8. FIG. 8 is a cross-sectional view showing the main structure of the vehicle air-conditioning unit 10 in this embodiment.

In the first embodiment, the evaporator 16 is disposed in the air-conditioning case 12 such that the air passing through the core portion 161 is oriented in the horizontal direction, that is, the air outflow surface 161*a* is disposed vertically relative to a horizontal plane. In contrast, the evaporator 16 in this embodiment is disposed obliquely within the air-conditioning case 12 such that the air passing through the core portion 161 is oriented diagonally downward.

Note that the structures of other components in this embodiment are the same as those in the first embodiment. In this embodiment, the effects exhibited by the structure common to that in the first embodiment can be obtained in the same manner as the first embodiment.

With the above-mentioned arrangement, the evaporator 16 is disposed obliquely such that the air passing through the core portion 161 is oriented diagonally downward. Thus, in this embodiment, a larger amount of condensed water Wcd can be dropped onto the bottom surface 127 of the air-conditioning case 12 on the air-flow downstream side of the evaporator 16, as compared to the case in which the evaporator 16 is disposed such that the air passing through the core portion 161 is oriented in the horizontal direction like the first embodiment. The large amount of condensed water Wcd passes through the communication path 128, so that the suction air passing through the communication path 128 can be more effectively cooled.

(Seventh Embodiment)

Figure 9:
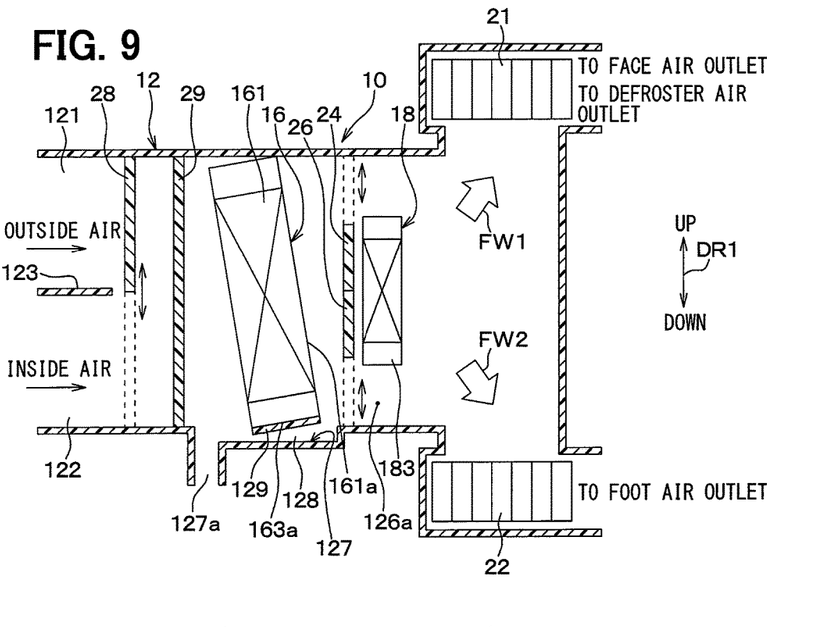
FIG. 9 is a cross-sectional view showing a main structure of a vehicle air-conditioning unit according to a seventh embodiment.

A vehicle air-conditioning unit 10 according to a seventh embodiment of the present disclosure will be described with reference to FIG. 9. FIG. 9 is a cross-sectional view showing the main structure of the vehicle air-conditioning unit 10 in this embodiment.

In the first embodiment, the evaporator 16 is disposed in the air-conditioning case 12 such that the air passing through the core portion 161 is oriented in the horizontal direction, that is, the air outflow surface 161a is disposed vertically relative to the horizontal plane. In contrast, the evaporator 16 in this embodiment is disposed obliquely within the air-conditioning case 12 such that the air passing through the core portion 161 is oriented diagonally upward.

Note that the structures of other components in this embodiment are the same as those in the first embodiment. In this embodiment, the effects exhibited by the structure common to that in the first embodiment can be obtained in the same manner as the first embodiment.

With the above-mentioned arrangement, the evaporator 16 is disposed obliquely such that the air passing through the core portion 161 is oriented diagonally upward. Thus, in this embodiment, a larger amount of condensed water Wcd can be dropped onto the bottom surface 127 of the air-conditioning case 12 on the air-flow upstream side of the evaporator 16, as compared to the case in which the evaporator 16 is disposed such that the air passing through the core portion 161 is oriented in the horizontal direction like the first embodiment. The condensed water Wcd dropped onto the bottom surface 127 of the air-conditioning case 12 on the air-flow upstream side of the evaporator 16 reaches the drain hole 127a formed on the air-flow upstream side of the evaporator 16. Therefore, it is possible to decrease a passage area of the communication path 128, or to eliminate the need for the communication path 128.

Note that the inclination of the evaporator 16, such as that in this embodiment, can apply not only to the first embodiment, but also to the second to sixth embodiments and the ninth to eleventh embodiments.

(Eighth Embodiment)

Figure 10:
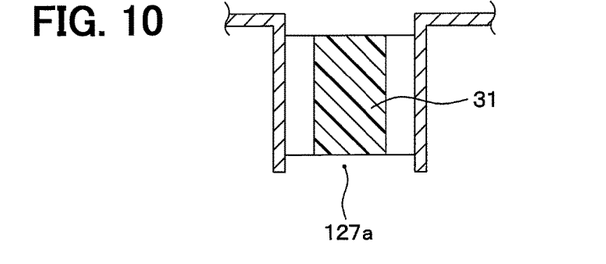
FIG. 10 is an enlarged view of a C part of a vehicle air-conditioning unit according to an eighth embodiment.

A vehicle air-conditioning unit 10 according to an eighth embodiment of the present disclosure will be described with reference to FIG. 10. FIG. 10 is an enlarged view of a C part shown in FIG. 3 in the vehicle air-conditioning unit 10 according to this embodiment. The vehicle air-conditioning unit 10 according to the second embodiment includes the metal fins 30 inside the drain hole 127a as the state changing portion that changes the state of the suction air. In contrast, the vehicle air-conditioning unit 10 according to this embodiment accommodates a cold storage material 31 inside the drain hole 127a as the state changing portion that changes the state of the suction air.

Even while the cold storage material 31 is accommodated in the drain hole 127a, the condensed water Wcd is capable of being discharged from a clearance between the drain hole 127a and the cold storage material toward the outside of the vehicle compartment.

Note that the structures of other components in this embodiment are the same as those in the second embodiment. In this embodiment, the effects exhibited by the structure common to that in the second embodiment can be obtained in the same manner as the second embodiment.

With the above-mentioned arrangement, cold air from the condensed water Wcd is absorbed in the cold storage material 31. Thus, even when the temperature of the outside air located outside the vehicle compartment is high, the suction air can be cooled by heat exchange between the cold storage material 31 and the suction air drawn from the drain hole 127a into the air-conditioning case 12, thereby preventing the reduction in the cooling capacity.

Note that the inclination of the evaporator 16, such as that in this embodiment, can apply not only to the first embodiment, but also to the second to sixth embodiments and the ninth to eleventh embodiments.

(Ninth Embodiment)

Figure 11:
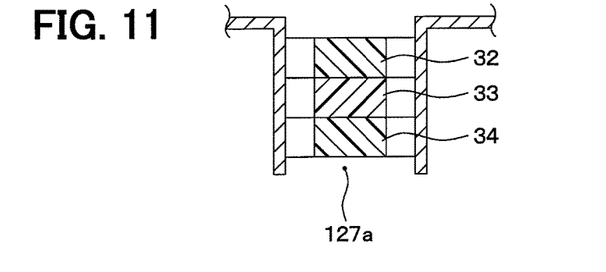
FIG. 11 is an enlarged view of a C part of a vehicle air-conditioning unit according to a ninth embodiment.

A vehicle air-conditioning unit 10 according to a ninth embodiment of the present disclosure will be described with reference to FIG. 11. FIG. 11 is an enlarged view of a C part shown in FIG. 3 in the vehicle air-conditioning unit 10 according to this embodiment. The vehicle air-conditioning unit 10 according to the second embodiment includes the metal fins 30 inside the drain hole 127a as the state changing portion that changes the state of the suction air. In contrast, the vehicle air-conditioning unit 10 according to this embodiment includes an air freshener 32, a sterilizing agent 33, and a deodorant 34 which are accommodated in the drain hole 127a as the state changing portions for changing the state of the suction air.

Even while the air freshener 32, the sterilizing agent 33, and the deodorant 34 are accommodated in the drain hole 127a, the condensed water Wcd is capable of being discharged from a clearance between the drain hole 127a and the air freshener, sterilizing agent, and deodorant toward the outside of the vehicle compartment.

The air freshener 32 is an aroma generating portion that causes an aroma component to be contained in the suction air. The sterilizing agent 33 is a sterilizing portion that sterilizes (for example, antisepticizes and disinfects) bacteria and viruses contained in the suction air. The deodorant 34 is a deodorizing portion that deodorizes smell contained in the suction air. The air freshener 32, the sterilizing agent 33, and the deodorant 34 are accommodated in a casing (not shown).

Note that the structures of other components in this embodiment are the same as those in the second embodiment. In this embodiment, the effects exhibited by the structure common to that in the second embodiment can be obtained in the same manner as the second embodiment.

As mentioned above, the state of the suction air is changed by the air freshener 32 accommodated in the drain hole 127a. That is, the aromatic component is contained through the air freshener 32 into the suction air that is drawn from the drain hole 127a into the air-conditioning case 12, thereby making it possible to improve the comfort for an occupant.

The state of the suction air is changed by the sterilizing agent 33 accommodated in the drain hole 127a. That is, the sterilizing agent 33 sterilizes bacteria and viruses contained in the suction air, thereby making it possible to improve the comfort for an occupant.

The state of the suction air is changed by the deodorant 34 accommodated in the drain hole 127a. That is, smell contained in the suction air drawn from the drain hole 127a into the air-conditioning case 12 is deodorized by the deodorant 34, thereby making it possible to improve the comfort for an occupant.

In this embodiment, the air freshener 32, the sterilizing agent 33, and the deodorant 34 are accommodated in the drain hole 127a. Alternatively, at least one of the air freshener 32, the sterilizing agent 33, and the deodorant 34 may be accommodated in the drain hole 127a.

(Tenth Embodiment)

Figure 12:
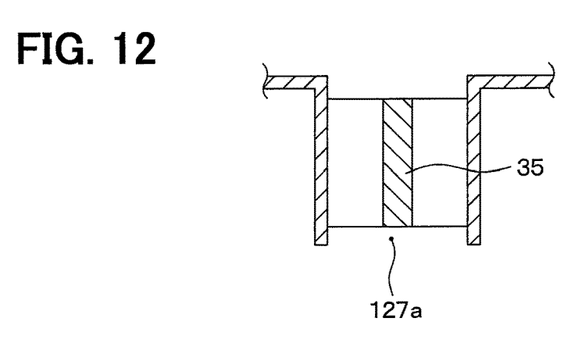
FIG. 12 is an enlarged view of a C part of a vehicle air-conditioning unit according to a tenth embodiment.

A vehicle air-conditioning unit 10 according to a tenth embodiment of the present disclosure will be described with reference to FIG. 12. FIG. 12 is an enlarged view of a C part shown in FIG. 3 in the vehicle air-conditioning unit 10 according to this embodiment. The vehicle air-conditioning unit 10 according to the second embodiment includes the metal fins 30 inside the drain hole 127a as the state changing portion that changes the state of the suction air. In contrast, the vehicle air-conditioning unit 10 according to this embodiment includes an electric heater 35 accommodated in the drain hole 127a as the state changing portion that changes the state of the suction air. Even while the electric heater 35 is accommodated in the drain hole 127a, the condensed water Wcd is capable of being discharged from a clearance between the drain hole 127a and the electric heater into the outside of the vehicle compartment.

The electric heater 35 has a heat generating portion (not shown) that generates heat by being energized. The electric heater 35 is a heating portion that heats the suction air. The electric heater 35 serves as an auxiliary heater that heats the suction air drawn from the drain hole 127a into the air-conditioning case 12, for example, when the outside air temperature is low.

Note that the structures of other components in this embodiment are the same as those in the second embodiment. In this embodiment, the effects exhibited by the structure common to that in the second embodiment can be obtained in the same manner as the second embodiment.

As mentioned above, the state of the suction air is changed by the electric heater 35 accommodated in the drain hole 127a. That is, the suction air drawn from the drain hole 127a into the air-conditioning case 12 is heated by the electric heater 35, thereby making it possible to improve the heating capacity. When the outside air temperature is low, this embodiment can prevent the condensed water Wcd attached to the drain hole 127a from being frozen and clogging the drain hole 127a.

(Eleventh Embodiment)

Figure 13:
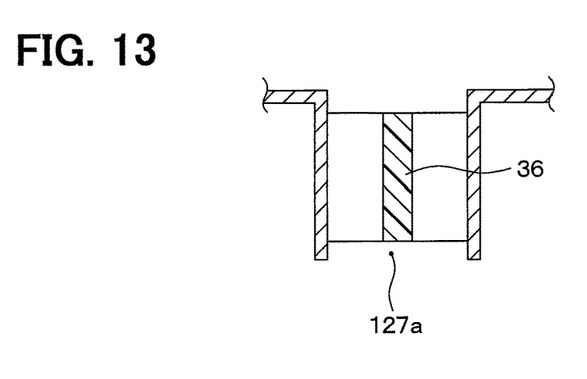
FIG. 13 is an enlarged view of a C part of a vehicle air-conditioning unit according to an eleventh embodiment.

A vehicle air-conditioning unit 10 according to an eleventh embodiment of the present disclosure will be described with reference to FIG. 13. FIG. 13 is an enlarged view of a C part shown in FIG. 3 in the vehicle air-conditioning unit 10 according to this embodiment. The vehicle air-conditioning unit 10 according to the second embodiment includes the metal fins 30 inside the drain hole 127a as the state changing portion that changes the state of the suction air. In contrast, in the vehicle air-conditioning unit 10 according to this embodiment, a circuit board 36 having a heat absorption portion of a Peltier element is accommodated in the drain hole 127a as the state changing portion that changes the state of the suction air. The circuit board 36 having the heat absorption portion of the Peltier element is a cooling portion that cools the suction air. Even while the circuit board 36 is accommodated in the drain hole 127a, the condensed water Wcd is capable of being discharged from a clearance in the drain hole 127a toward the outside of the vehicle compartment.

The structures of other components in this embodiment are the same as those in the second embodiment. In this embodiment, the effects exhibited by the structure common to that in the second embodiment can be obtained in the same manner as the second embodiment.

As mentioned above, the state of the suction air is changed by the circuit board 36 having the heat absorption portion of the Peltier element and accommodated in the drain hole 127a. That is, the suction air drawn from the drain hole 127a into the air-conditioning case 12 is cooled by the heat absorption portion of the Peltier element mounted on the circuit board 36, thereby making it possible to improve the cooling capacity.

(Twelfth Embodiment)

Figure 14:
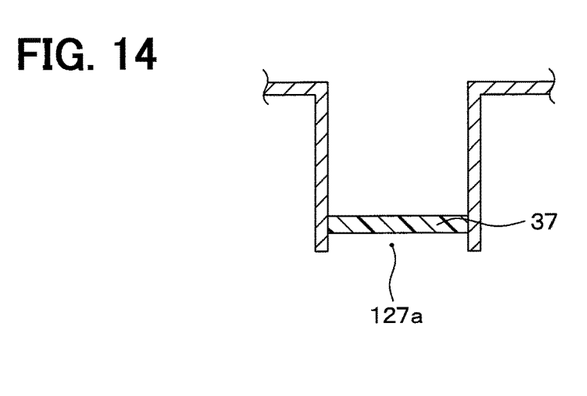
FIG. 14 is an enlarged view of a C part of a vehicle air-conditioning unit according to a twelfth embodiment.

A vehicle air-conditioning unit 10 according to a twelfth embodiment of the present disclosure will be described with reference to FIG. 14. FIG. 14 is an enlarged view of a C part shown in FIG. 3 in the vehicle air-conditioning unit 10 according to this embodiment. The vehicle air-conditioning unit 10 according to the second embodiment includes the metal fins 30 inside the drain hole 127a as the state changing portion that changes the state of the suction air. In contrast, the vehicle air-conditioning unit 10 according to this embodiment includes a dust-proof filter 37 accommodated in the drain hole 127a as the state changing portion that changes the state of the suction air. The dust-proof filter 37 is a foreign-matter removal portion that removes foreign matter from the suction air. Even while the dust-proof filter 37 is accommodated in the drain hole 127a, the condensed water Wcd is capable of being discharged from a clearance between the drain hole 127a and the dust-proof filter into the outside of the vehicle compartment.

Note that the structures of other components in this embodiment are the same as those in the second embodiment. In this embodiment, the effects exhibited by the structure common to that in the second embodiment can be obtained in the same manner as the second embodiment.

As mentioned above, the state of the suction air is changed by the dust-proof filter 37 accommodated in the drain hole 127a. That is, foreign matter, such as fugitive dust, contained in the suction air drawn from the drain hole 127a into the air-conditioning case 12 is removed by the dust-proof filter 37, thereby making it possible to improve the comfort for an occupant.

(Other Embodiments)

In the above-mentioned second and eighth to twelfth embodiments, the drain hole 127a accommodates therein the metal fins 30, the cold storage material 31, the air freshener 32, the sterilizing agent 33, the deodorant 34, the electric heater 35, the circuit board 36 having the Peltier element, or the dust-proof filter 37. Alternatively, for example, the metal fins 30, the cold storage material 31, the air freshener 32, the sterilizing agent 33, the deodorant 34, the electric heater 35, the circuit board 36 having the Peltier element, or the dust-proof filter 37 may be provided in at least one of the communication path 128, the drain hole 127a, and the vicinity of the drain hole 127a which are formed in the air-conditioning case 12 of the vehicle air-conditioning unit 10 in the respective first to twelfth embodiments.

In each of the first, third, fourth, sixth, and seventh embodiments, the drain hole 127a is provided on the air-flow downstream side with respect to the dust-proof filter 29. However, the first, third, fourth, sixth, and seventh embodiments may be modified by providing the drain hole 127a on the air-flow upstream side with respect to the dust-proof filter 29. In this case, the communication path 128 may be extended from the air-flow downstream side of the evaporator 16 up to the drain hole 127a positioned on the air-flow upstream side with respect to the dust-proof filter 29.

The present disclosure can also be applied to a vehicle air-conditioning unit 10 capable of setting a two-phase flow mode. In the two-phase flow mode, the inside of the air-conditioning case 12 is separated into two upper and lower spaces, and the outside air flowing through the upper space is introduced into the vehicle interior through the face air outlet and defroster air outlet, while the inside air flowing through the lower space is introduced into the vehicle interior through the foot air outlet. In this case, the drain hole 127a can be formed on a side of the inside-air phase (on a side of the lower space). With this arrangement, even in any of the bi-level mode, foot mode, and foot-defroster mode, the suction air drawn from the drain hole 127a into the air-conditioning case 12 is introduced into the vehicle interior through the foot air outlet, thereby making it possible to reduce the discomfort for an occupant due to bad smell, smoke, or the like contained in the outside air.

In the eleventh embodiment, only the heat absorption portion in a heat generation portion and the heat absorption portion of the Peltier element are disposed within the drain hole 127a. Alternatively, only the heat generation portion in the heat absorption portion and the heat generation portion of the Peltier element may be disposed within the drain hole 127a. In this case, the state of the suction air is changed by the heat generation portion of the Peltier element. That is, the suction air drawn from the drain hole 127a into the air-conditioning case 12 can be heated by the heat generation portion of the Peltier element, thereby improving the heating capacity.

Note that the present disclosure is not limited to the above-mentioned embodiments, and various modifications and changes can be made to these embodiments as appropriate. The above-mentioned respective embodiments are not irrelevant to each other, and any appropriate combination between them may be implemented except when the combination seems obviously impossible. It is obvious that in the above-mentioned respective embodiments, the components configuring the embodiments are not necessarily essential particularly unless otherwise specified and except when clearly considered to be essential in principle. Even when referring to a specific number about a component, including the number, a numerical value, an amount, a range, and the like in the above-mentioned respective embodiments, the component in the embodiments should not be limited to the specific number particularly unless otherwise specified, and except when obviously limited to the specific number in principle.

What is claimed is:

1. An air-conditioning unit for a vehicle, comprising:
   an air-conditioning case;
   a cooler disposed in the air-conditioning case and adapted to cool air flowing through the air-conditioning case; and
   a blower disposed on an air-flow downstream side of the cooler and adapted to blow the air into a vehicle interior, wherein
   the air-conditioning case includes a drain hole to discharge condensed water generated in the cooler toward an outside of the air-conditioning case, and
   the air-conditioning unit cools suction air drawn from the drain hole into the air-conditioning case.

2. The air-conditioning unit for a vehicle according to claim 1, wherein
   the cooler includes a core portion that exchanges heat with air flowing through the air-conditioning case to cool the air, and a bottom portion that forms a bottom surface part of the cooler, and
   the suction air is cooled by exchanging heat with at least one of the core portion, the bottom portion, and the condensed water.

3. The air-conditioning unit for a vehicle according to claim 2, wherein
   the drain hole is disposed on an air-flow upstream side with respect to the cooler, and
   at least part of the suction air is cooled by exchanging heat with the core portion of the cooler while passing through the core portion.

4. The air-conditioning unit for a vehicle according to claim 2, wherein
   the drain hole is provided at a bottom surface of the air-conditioning case located below the cooler,
   a communication path is formed between the bottom surface of the air-conditioning case and the bottom portion of the cooler so as to communicate a space on the air-flow downstream side of the cooler with a space where the drain hole is formed,
   the condensed water on the air-flow downstream side of the cooler passes through the communication path and reaches the drain hole, and
   at least part of the suction air is cooled by exchanging heat with the condensed water when the at least part of the suction air passes through the communication path and reaches the air-flow downstream side of the cooler.

5. The air-conditioning unit for a vehicle according to claim 4, wherein
   the drain hole is provided directly under the cooler.

6. The air-conditioning unit for a vehicle according to claim 2, further comprising:
   a heat dissipation member disposed in the drain hole so as to promote the heat exchange between the suction air and the condensed water.

7. The air-conditioning unit for a vehicle according to claim 6, wherein
   the drain hole is disposed on the air-flow downstream side with respect to the cooler.

8. The air-conditioning unit for a vehicle according to claim 2, further comprising:
   metal fins disposed in the drain hole so as to promote the heat exchange between the suction air and the condensed water.

9. The air-conditioning unit for a vehicle according to claim 3, wherein
   the air-conditioning case includes a communication path that communicates a space on the air-flow downstream side of the cooler with a space on the air-flow upstream side of the cooler,
   the condensed water on the air-flow downstream side of the cooler passes through the communication path and reaches the drain hole, and
   at least part of the suction air is cooled by exchanging heat with the condensed water when the at least part of the suction air passes through the communication path and reaches the air-flow downstream side of the cooler.

10. The air-conditioning unit for a vehicle according to claim 9, wherein
    the air-conditioning case includes a support portion that supports the bottom portion of the cooler, and
    the suction air passing through the communication path is cooled by exchanging heat with the bottom portion of the cooler.

11. The air-conditioning unit for a vehicle according to claim 9, further comprising:
    a heat dissipation member disposed in at least one of the communication path and the drain hole so as to promote heat exchange between the suction air and the condensed water.

12. The air-conditioning unit for a vehicle according to claim 9, further comprising:
    metal fins disposed in at least one of the communication path and the drain hole so as to promote heat exchange between the suction air and the condense water.

13. The air-conditioning unit for a vehicle according to claim 1, wherein
the suction air is cooled before being blown into the vehicle interior.

14. An air-conditioning unit for a vehicle, comprising:
an air-conditioning case;
a cooler disposed in the air-conditioning case and adapted to cool air flowing through the air-conditioning case; and
a blower disposed on an air-flow downstream side of the cooler and adapted to blow the air into a vehicle interior, wherein
the air-conditioning case includes a drain hole to discharge condensed water generated in the cooler toward an outside of the air-conditioning case, and at least one of a heat dissipation member that promotes heat exchange between the suction air and the condensed water, a cooling portion that cools the suction air, a heating portion that heats the suction air, a deodorant that deodorizes smell contained in the suction air, a foreign matter removal portion that removes foreign matter from the suction air, an aroma generating portion that causes an aroma component to be contained in the suction air, and a sterilizing agent that sterilizes the suction air.

15. The air-conditioning unit for a vehicle according to claim 14, wherein
at least one of the heat dissipation member, the cooling portion, the heating portion, the deodorant, the foreign matter removal portion, the aroma generating portion and the sterilizing agent is provided in the drain hole.

16. An air-conditioning unit for a vehicle, comprising:
an air-conditioning case;
a cooler disposed in the air-conditioning case and adapted to cool air flowing through the air-conditioning case; and
a blower disposed on an air-flow downstream side of the cooler and adapted to blow the air into a vehicle interior, wherein
the air-conditioning case includes a drain hole to discharge condensed water generated in the cooler toward an outside of the air-conditioning case, and at least one of metal fins that promote heat exchange between the suction air and the condensed water, a circuit board having a Peltier element that cools the suction air, an electric heater that heats the suction air, a deodorant that deodorizes smell contained in the suction air, a filter that removes foreign matter from the suction air, an air freshener that causes an aroma component to be contained in the suction air, and a sterilizing agent that sterilizes the suction air.

17. The air-conditioning unit for a vehicle according to claim 16, wherein
at least one of the metal fins, the circuit board having a Peltier element, the electric heater, the deodorant, the filter, the air freshener and the sterilizing agent is provided in the drain hole.

* * * * *